US006396436B1

(12) United States Patent
Lissel et al.

(10) Patent No.: US 6,396,436 B1
(45) Date of Patent: May 28, 2002

(54) RADAR METHOD FOR MEASURING DISTANCES BETWEEN AND RELATIVE SPEEDS OF A VEHICLE AND ONE OR MORE OBSTACLES

(75) Inventors: Ernst Lissel, Wolfsburg; Hermann Rohling, Wolfenbüttel; Marc-Michael Meinecke, Wolfsburg, all of (DE)

(73) Assignee: Volkswagen AG, Wolfsburg/Fallersleben (DE)

( * ) Notice: Subject to any disclaimer, the term of this patent is extended or adjusted under 35 U.S.C. 154(b) by 0 days.

(21) Appl. No.: 09/545,528

(22) Filed: Apr. 7, 2000

(30) Foreign Application Priority Data

Apr. 7, 1999 (DE) ........................................ 199 15 484

(51) Int. Cl.[7] .......................... G01S 13/93; G01S 13/42

(52) U.S. Cl. ......................... 342/70; 342/104; 342/109; 342/115; 342/118; 342/128; 342/130; 342/131; 342/132; 342/192; 342/195; 342/196

(58) Field of Search ..................... 342/70–72, 104–115, 342/118, 127–133, 192–197, 165

(56) References Cited

U.S. PATENT DOCUMENTS 5,757,307 A * 5/1998 Nakatani et al. .............. 342/70
5,767,793 A * 6/1998 Agravante et al. ........ 342/70 X
5,929,802 A * 7/1999 Russell et al. ................ 342/70
5,940,011 A * 8/1999 Agravante et al. ........ 342/70 X
5,959,570 A * 9/1999 Russell ........................ 342/70
5,969,667 A * 10/1999 Farmer et al. .............. 342/165
6,107,956 A * 8/2000 Russell et al. ................ 342/70
6,121,915 A * 9/2000 Cooper et al. ................ 342/70

FOREIGN PATENT DOCUMENTS

DE 42 44 608 C2 3/1997
DE 195 38 309 A1 4/1997
DE 693 09 335 T2 4/1997

* cited by examiner

*Primary Examiner*—Bernarr E. Gregory
(74) *Attorney, Agent, or Firm*—Kenyon & Kenyon

(57) ABSTRACT

The present invention relates to a CW radar method for measuring distances between and relative speeds of a vehicle and one or more obstacles. The present invention further provides that the transmission (s(t)) can be composed of at least four consecutive chirps (A, B, C, D), each having different slopes. The intersection points of all lines in the distance-relative speed diagram from two chirps (A, B) can be calculated from all the ascertained frequency positions $K_{1,n}$ and $K_{2,p}$. To validate those intersection points, one may observe whether a peak exists in the Fourier spectrum of a third chirp C at a frequency position $K_{3,q}$, whose assigned line intersects a surrounding area of the intersection point in the distance-relative speed diagram. A further validation of those intersection points involves observing whether a peak exists in the Fourier spectrum of a fourth chirp D at a frequency position $K_{4,r}$, whose assigned line intersects a surrounding area of the intersection point in the distance-relative speed diagram. The intersection points are then regarded as valid, when they satisfy both conditions.

18 Claims, 5 Drawing Sheets

RADAR METHOD FOR MEASURING DISTANCES BETWEEN AND RELATIVE SPEEDS OF A VEHICLE AND ONE OR MORE OBSTACLES

FIELD OF THE INVENTION

The present invention relates to a radar method for measuring distances between and relative speeds of a vehicle and one or more obstacles.

BACKGROUND OF THE INVENTION

From the related art of German Patent No. 42 44 608 A1, incorporated herein by reference, a continuous wave ("CW") radar method is known in which the transmission signal generated by an oscillator is split up into constant-frequency, unspaced consecutive bursts (signal portions). In this case, the receiving signal reflected at an obstacle is mixed down with the transmission signal to baseband in a two-channel IQ mixer. The IQ mixer supplies a complex, relatively low-frequency mixer output signal, which is used for acquiring signals for the distances and relative speeds of a plurality of obstacles.

In the described method, four measurements are conducted with different transmission signals during a measuring cycle. In a first measurement, the oscillator chronologically generates consecutive bursts having a frequency which linearly increases in an incremental manner from a minimum to a maximum value. Subsequently, in a second measurement the oscillator generates a sequence of bursts having a frequency which linearly decreases in an incremental manner from a maximum value to a minimum value. In both measurements, a complex sampling value is acquired at the end of each reflected burst, and through mixing with the transmission signal bursts, first and second in-phase and quadrature-phase signals, respectively, are acquired for the distances and relative speeds. During a third measurement, the transmission signal is composed of bursts having the same frequency. At the end of each reflected burst, a complex sampling value for acquiring third in-phase and quadrature-phase signals for the relative speeds of the vehicle and the obstacle is obtained through mixing with the transmission signal bursts. In this case, a series of bursts having a monotonically rising or falling slope or frequency curve are designated altogether as a chirp.

Using Fourier transforms, all mixer output signals of the described first three measurements are converted into frequency values which are a function of relative speed and distance, and represent three sets of straight lines intersecting each other in a distance-relative speed diagram, the intersections of these lines representing potential obstacles. Those potential obstacles may be actual obstacles or ghost-obstacles generated through mathematical combination. Thus, in a fourth measurement, a transmission signal is emitted during a fourth measurement, whose bursts, however, do not follow each other monotonically, but are arranged according to the coefficients of a residual class code. The receiving signal reflected during the fourth measurement is composed of the superposition of all object reflections having different amplitudes and phases.

The correctness and single-valuedness of all intersection parameters of the lines in the distance-relative speed diagram, which result from the first three measurements, are tested by generating, for each of the potential obstacles, a setpoint mixer output signal for the fourth measurement's transmission signal, the setpoint mixer output signal then being correlated with the actual mixer output signal of the fourth measurement. The special correlation properties of the residual class codes provide a high correlation value only for real obstacles and provide a low correlation value for ghost-obstacles.

The correlation begins with the obstacle having the highest amplitude. If a real obstacle is detected, then the corresponding setpoint mixer output signal is subtracted from the actual mixer output signal and the correlation continues in order of decreasing amplitude. The setpoint mixer output signal's normalized amplitude is used during the correlation but only the phase portion of the complex signals is considered.

However, the IQ mixer used in the known method to acquire in-phase and quadrature-phase signals can cause a number of errors including, for example, offset errors, distortion of the modulation signal at the I and Q outputs, asymmetries of the I and Q output sensitivity, and orthogonal errors between the I and Q outputs, so that a complicated pretreatment of the radar data in the time interval, and an error calibration, are necessary.

German Patent No. 195 38 309 A1, discloses a generic radar method in which the form of the transmission signal and the manner in which the measured signals are evaluated are essentially implemented in a manner described previously in German Patent No. 42 44 608 A1. However, using the emitted transmission signals, the receiving signals reflected at the obstacles are demodulated here by only a one-channel mixer, whose output signal is not the signal of a phase-separated amplitude curve. This, in turn, forms the basis of a signal evaluation, in which target parameters can be ascertained from the transmission signal by using a modulated form of the transmission signal, with the aid of noncomplex, sampled raw radar data and these target parameters can be classified as right or wrong.

A further disadvantage of the above-mentioned evaluation procedure is that the ghost obstacles are only eliminated using the special correlation coding. This can result in a high error rate in the case of a plurality of obstacles, since the ghost obstacles cannot be reliably suppressed due to their usual high numbers.

SUMMARY OF THE INVENTION

The present invention provides a method and device for further simplifying the known CW radar method to evaluate the mixer output signal quickly, and at the same time, reliably.

The present invention provides a radar device or method for measuring distances between and relative speeds of a vehicle and one or more obstacles, in which a transmission signal (s(t)) is emitted, which is generated using an oscillator (1) and has a sequence of linear chirps (A, B, C, D); in which a receiving signal (e(t)) reflected at the obstacles (5) is simultaneously received during the emission of the transmission signal (s(t)); in which the receiving signal (e(t)) is mixed with the transmission signal (s(t)) in a mixer (6) for acquiring a mixer output signal (m(t)); and in which the mixer output signal (m(t)) is processed in a signal processing device (9) to obtain signal values for the distances ($R_i$) of the obstacles (5) to the vehicle, and for the relative speeds ($v_{Rel,i}$) of the vehicle and the detected obstacles (5); the mixer output signal (m(t)) for each chirp (A, B, C, D) of the transmission signal (s(t)) being analyzed using a Fourier transform, and the frequency positions $K_i$ of the obstacles (5) being calculated as peaks in the Fourier transform spectrum; wherein a sequence of the transmission signal (s(t)) has at least four consecutive chirps (A, B, C, D) having the slopes ($m_1$, $m_2$, $m_3$, $m_4$), respectively, which are different from those of the other chirps (A, B, C, D); in the distance-relative speed diagram, the intersection points ($R_i$, $v_{rel,i}$) of all the lines from two chirps (A, B) are calculated from all of the ascertained frequency positions $K_{1,n}$ and $K_{2,p}$; a first condition is checked to determine whether a peak in the Fourier spectrum of the third chirp (C) exists at a frequency position $K_{3,q}$, whose assigned line in the distance-relative speed diagram intersects a surrounding area of the intersection point ($R_i$, $v_{rel,i}$); a second condition is checked to determine whether a peak in the Fourier spectrum of the fourth chirp (D) exists at a frequency position $K_{4,r}$, whose assigned line in the distance-relative speed diagram intersects a surrounding area of the intersection point ($R_i$, $v_{rel,i}$); and the intersection points ($R_i$, $v_{rel,i}$) are then regarded as valid, when they fulfill both conditions.

Another embodiment of the present invention provides for a method or device, as described in any of the embodiments described herein, in which the intersection points ($R_1$, $v_{rel,i}$) of all lines from the first two chirps (A, B) are calculated from all the ascertained frequency positions $K_{1,n}$ and $K_{2,p}$ according to the equations $$R_i = \Delta R \cdot \frac{\kappa_{2,p} - \kappa_{1,n}}{m_1 - m_2}$$

and/or $$v_{Rel,i} = \Delta v \cdot \frac{m_1 \kappa_{2,p} - m_2 \kappa_{1,n}}{m_1 - m_2},$$

where $\Delta R$ signifies the distance resolution and $\Delta v$ signifies the resolution of the speed.

A further embodiment of the present invention provides a method or device, as described in any of the embodiments described herein, wherein the calculated intersection points ($R_i$, $v_{Rel,i}$) are checked to determine whether a peak in the Fourier spectrum of a third chirp (C) exists at a frequency position $K_{3,q}$, for which $$k_{3,q} - \varepsilon_1 \leq \left(\frac{v_{Rel,i}}{\Delta v} - m_3 \cdot \frac{R_i}{\Delta R}\right) \leq k_{3,q} + \varepsilon_1$$

is valid, where $\epsilon_1$ represents a parameter of predefined magnitude.

A further embodiment of the present invention provides a method or device, as described in any of the embodiments described herein, wherein the intersection points ($R_i$, $v_{Rel,i}$) are checked to determine whether a peak in the Fourier spectrum of a fourth chirp (D) exists at a frequency position $K_{4,r}$) for which $$k_{4,r} - \varepsilon_2 \leq \left(\frac{v_{Rel,i}}{\Delta v} - m_4 \cdot \frac{R_i}{\Delta R}\right) \leq k_{4,r} + \varepsilon_2$$

is valid, where $\epsilon_2$ represents a parameter of predefined magnitude.

A further embodiment of the present invention provides a method or device, as described in any of the embodiments described herein, wherein the values of the parameters $\epsilon_1$ and $\epsilon_2$ are in the range of 0.3 to 0.7, preferably in the range of 0.4 to 0.6, and preferably 0.5.

The present invention generates at least four sets of lines in the distance-relative speed diagram. A valid intersection, therefore a real obstacle, can then be more reliably detected when four of the lines, each belonging to one of the chirps, form a common intersection which, because of existing measuring accuracies, is then designated as valid when all four lines intersect a predefined area segment in a distance-relative speed diagram. This area segment is defined by calculating the intersection of two lines and forming a surrounding range around it, through which the two other lines must pass. This surrounding range is also designated mathematically as the $\epsilon$-range, $\epsilon$ being a parameter for the size of the surrounding range.

Consequently, the intersections are checked twice, so that only a small proportion of ghost targets is still present in the detected and tested intersections. In this context, the evaluation procedure is not only reliable, but also can be implemented quickly because of the simple mathematical equations. The correlation coding known from the related art is no longer necessary.

The present invention is also described in German Application No. 199 15 484, filed on Apr. 7, 1999, from which the present invention claims priority.

Additional advantageous refinements of the present invention are cited in the dependent claims. An exemplary embodiment of the radar method or device according to the present invention is described below in detail using the included figures.

BRIEF DESCRIPTION OF THE DRAWINGS

Exemplary embodiments of the present invention are described more precisely in the following descriptions and shown in the drawings, in which.

DETAILED DESCRIPTION OF THE DRAWINGS

Figure 1:
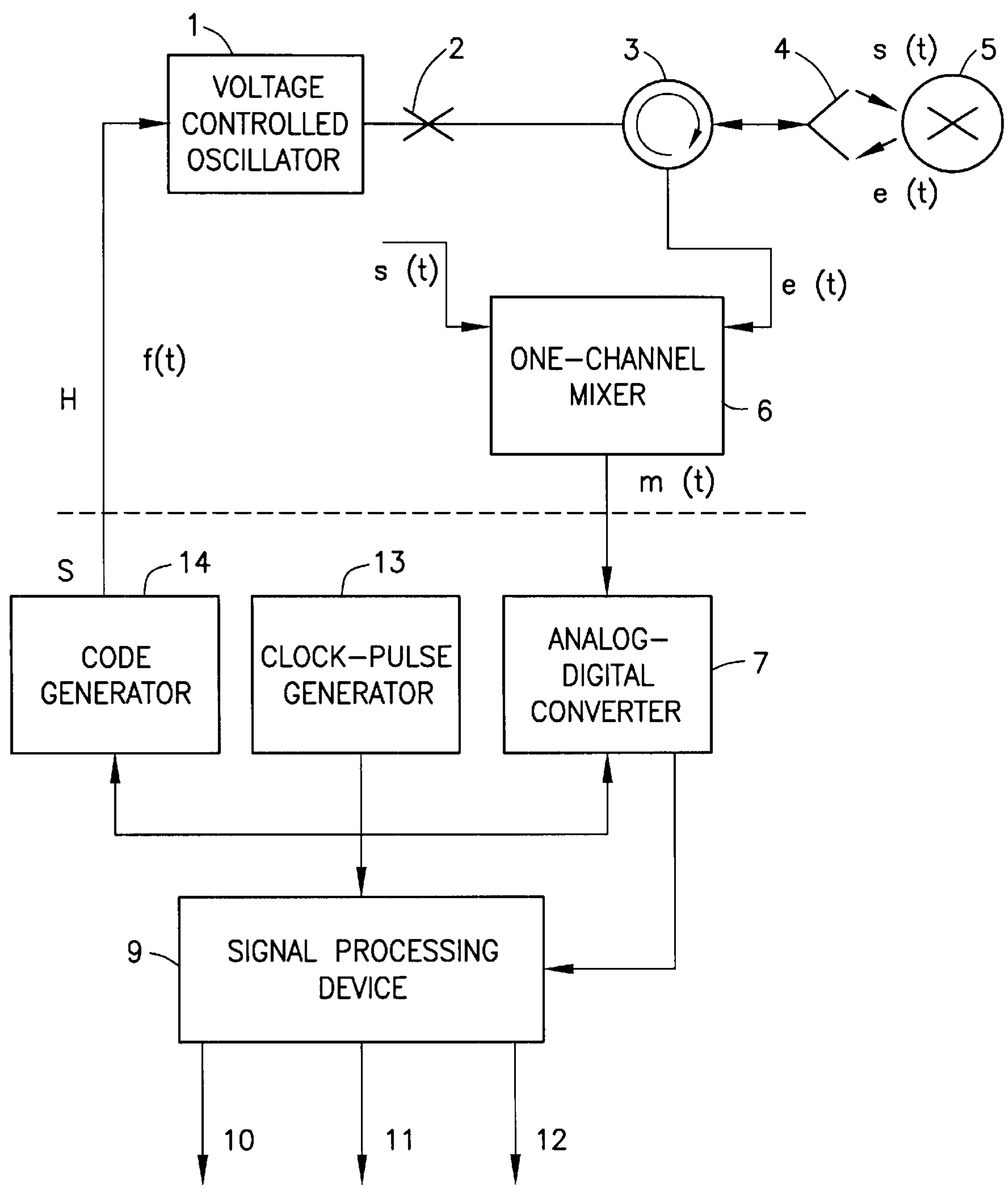
FIG. 1 shows the block diagram of the radar device used in the method or device according to the present invention.

Referring to FIG. 1, the block diagram shows that the radar device or method is divided into a high-frequency or microwave section H and a signal processing section S. Voltage-controlled oscillator 1, which generates a continuous microwave signal in the usual manner whose frequency can be changed proportionally to a control modulation voltage f(t) over several multiples of 150 MHz, using a varactor, is used in the method or device of the present invention for generating a transmission signal s(t). This transmission signal has bursts which are each of constant-frequency and travel through coupler 2 and circulator 3 to the transmission and receiving aerial or antenna 4, the working direction of the circulator being indicated by the arrow. Reference numeral 5 designates an obstacle located on the roadway in front of the vehicle, the vehicle being equipped with the radar device. The paths of transmission signals s(t) and receiving signals e(t) are indicated by arrows.

Circulator 3 separates signals s(t) from reflected receiving signals e(t) so that only the receiving signals reach the right input of one-channel mixer 6, while transmission signals s(t) decoupled by coupler 2 are conveyed to the left input in the figure. One-channel mixer 6 forms the differential frequency between the transmission and receiving signals as a real mixer output signal m(t), which initially exists in analog form. A conversion into digital signals occurs in a series-connected analog-digital converter 7. The digital signals are supplied to signal processing device 9, at whose outputs 10 through 12 respective signal values for the distance, the relative speed, and the amplitude, that is, the size of the obstacle, are found. Signal processing unit 9 assigned to clock-pulse generator 13 is used on its part to generate control voltage f(t) for oscillator 1 using code generator 14.

Figure 2A:
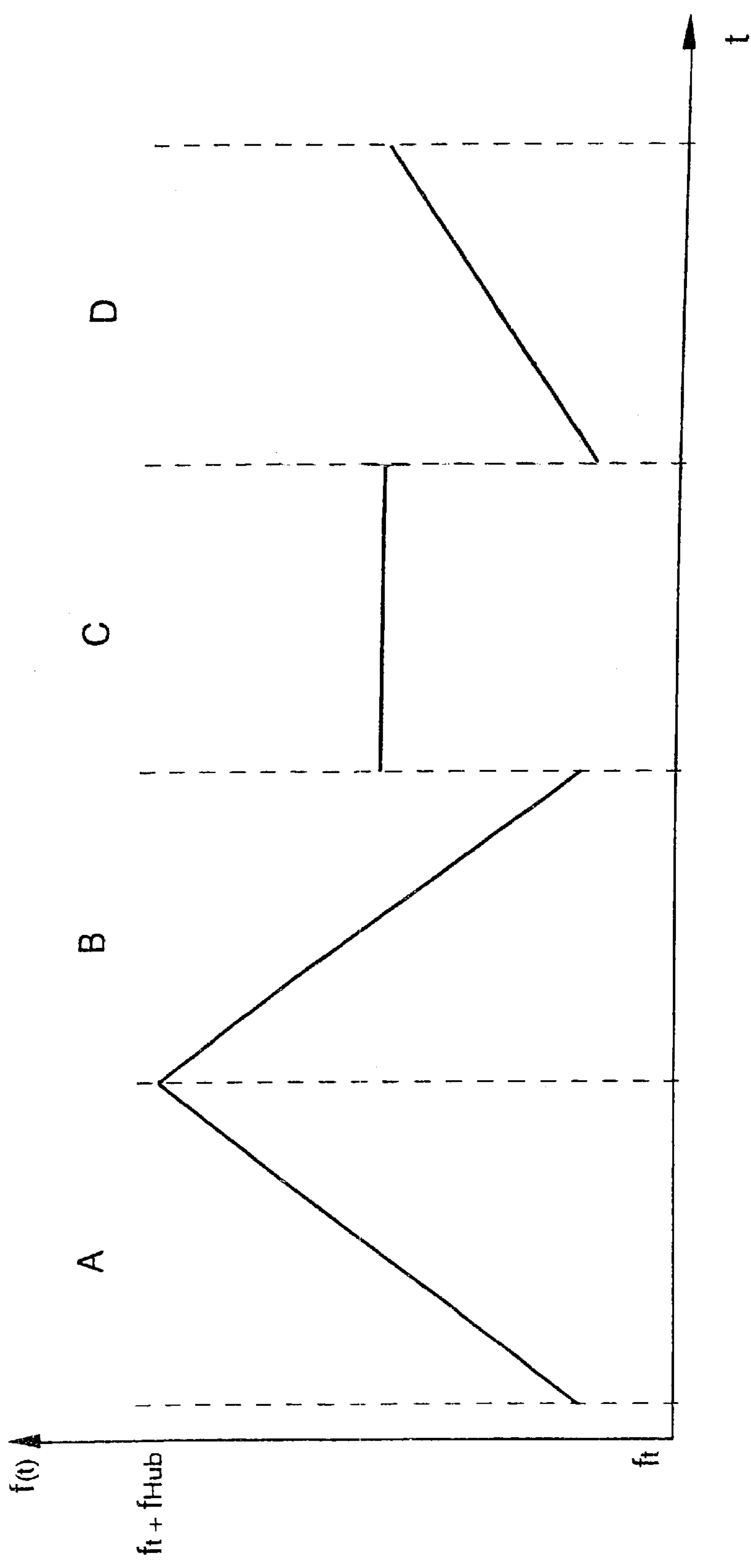
FIGS. 2*a*, 2*b* show characteristic curves of different transmission signals during a measuring cycle.
Figure 2B:
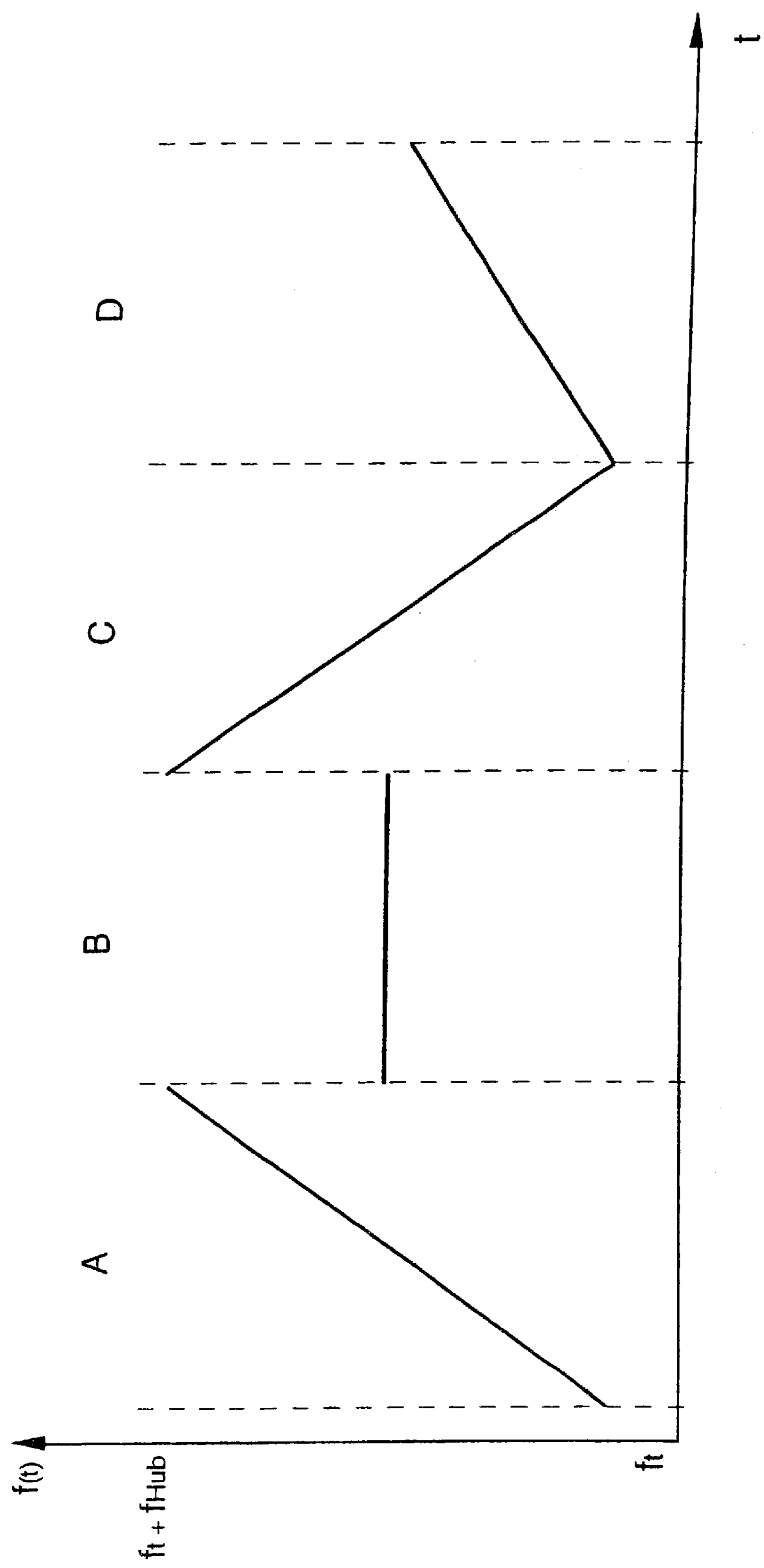

In the method or device according to the present invention, transmission signal s(t), whose transmission frequency f is represented as a function of time t in FIGS. 2*a* and 2*b*, emitted in four different blocks A, B, C, and D. All four measurements occur sequentially, that is, measurement A takes place, then accordingly, measurement B, and so on. The characteristic frequency curves of blocks A through D, which are displayed in FIGS. 2*a* and 2*b*, and are also designated as chirps, are characterized in that the characteristic frequency curves over time in the different chirps A through D have different slopes $m_1$, $m_2$, $m_3$, and $m_4$. All four slopes $m_1$ through $m_4$ can be chosen differently.

A typical characteristic curve is depicted in FIG. 2*a*, in which during chirps A and B, oscillator 1 of the radar device is controlled by a corresponding control voltage in such a manner, that during chirp A the oscillator generates, starting from a minimum frequency, a frequency curve rising linearly to a maximum value. During chirp B, however, oscillator 1 generates, starting from the maximum frequency, a linear frequency curve having an opposite slope, so that the minimum frequency is eventually reached again. In contrast, a characteristic frequency curve having a slope $m_3=0$ occurs during chirp C. Finally, during chirp D, the frequency rises linearly, starting from the minimum frequency, with a slope $m_4$ which is half as large as slope $m_1$ of chirp A's characteristic frequency curve.

The characteristic frequency curve in FIG. 2*b* is different from that in FIG. 2*a*, because the frequency curves of the two chirps B and C are interchanged. In addition, further variations of the different frequency curves are possible since individual chirps A, B, C, D, are independent of each other and are each subject to a separate evaluation.

Figure 3:
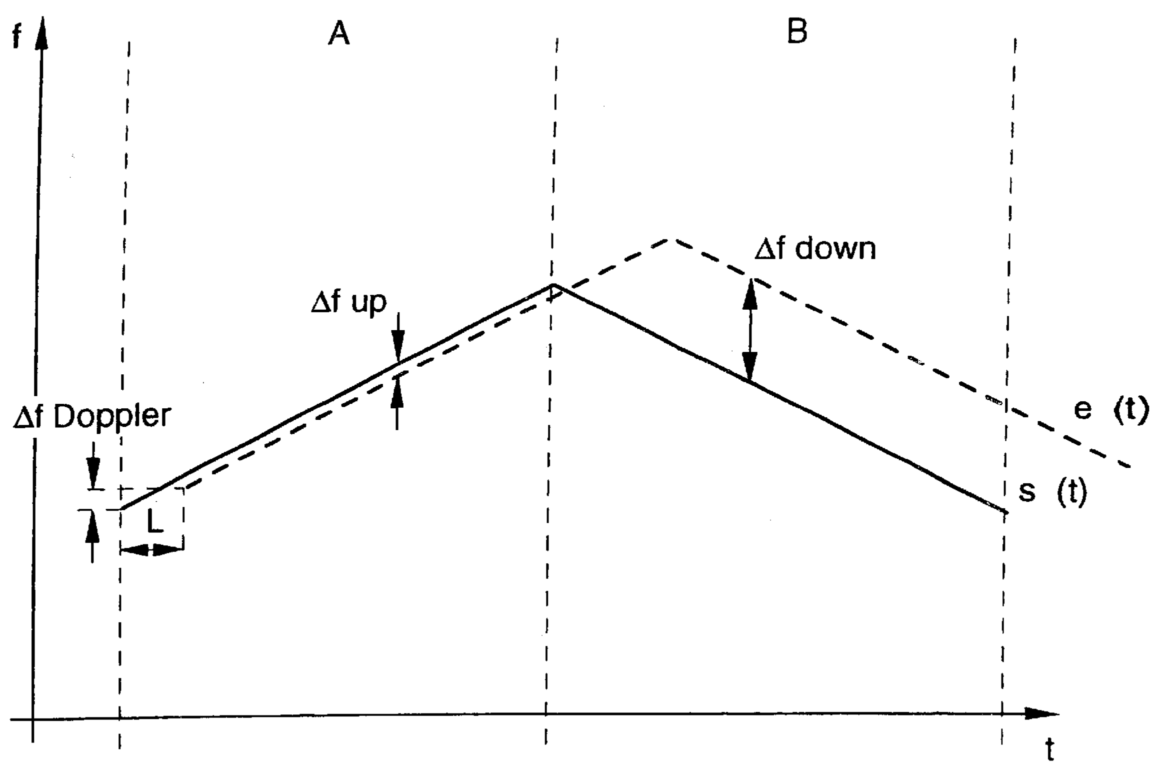
FIG. 3 shows the characteristic curves of the,transmission and receiving signals of measurements A and B.

FIG. 3 displays the characteristic curves of transmission signals s(t) and reflected receiving signals e(t) of measurements A and B in a frequency-time diagram in accordance with FIG. 2*a*. The echo time is designated with L. The Doppler frequency is designated with $\Delta f_{Doppler}$. From this, as well as from frequency differences $\Delta f_{up}$ and $\Delta f_{down}$, the equations $$k = \Delta f_{Doppler} = \left(\frac{\Delta f_{down} - \Delta f_{up}}{2}\right)$$

and/or $$l = \Delta f_{Entf} = \left(\frac{\Delta f_{down} + \Delta f_{up}}{2}\right)$$

result for the relative speed and the distance.

A continuous wave (CW) rader is characterized by distance resolution $\Delta R$, by maximum range $R_{max}$, by speed resolution $\Delta v$, and by the of the processed relative speed $v_{Rel,min}$ through $v_{Rel,max}$. In this context, the two relevant relationships of the rader parameters to the transmission signal are given by $$\Delta R = \frac{2 f_{Hub,\,Radar}}{c}$$

and/or

-continued $$\Delta v = \frac{2 T_{Chirp,Radar}}{\lambda}.$$

As discussed above with reference to FIGS. 2*a* and 2*b*, the transmission signal of the CW radar is composed of a sequence of linear chirps, each having a different slope. Slope $m_i$ of an individual chirp i, with i=A, B, C, D, is defined by $$m_i = \frac{f_{Hub,\,Chirp_i}}{f_{Hub,\,Radar}}$$

Each Fourier transform executed after measurements A through D yields spectral lines in the respective Fourier spectrums, which are established by reflections from obstacles. If slope $m_i$ is not equal to 0, then the above-indicated designations for k and I, which characterize peak position K in the Fourier spectrum, are valid. If slope $m_i$ is equal to 0, as is the case in chirps C in FIG. 2*a* and B in FIG. 2*b*, then the frequencies indicated by the maxima are equal to the Doppler frequencies of the obstacles.

Using the retrieved peaks in the Fourier spectrum as a baseline, the search ensues for potential obstacles in the distance-relative speed diagram (FIG. 4), the frequencies ascertained in chirps A–D each being indicated by groups of intersecting lines. Lines A1, A2, and A3 represented in FIG. 4 relate to chirp A, lines B1, B2, and B3 relate to chirp B, lines C1, C2, and C3 relate to chirp C, and lines D1, D2, and D3 to chirp D.

The information from a processed chirp j=A, B, C, or D alone can be ambiguous. It may merely limit the target coordinates of the $i_{th}$ target to one degree of freedom, meaning that the following formula is valid $$v_{Rel,i} = \frac{\Delta v}{\Delta R} \cdot m_j \cdot R_i + \Delta v \cdot \kappa_j.$$

Therefore, the present invention provides that a plurality of chirps having different slopes can be used in order to obtain unequivocal measurements or single-valued measurements in the intersection of these lines.

Initially, all ideal points of intersection $R_j$, $v_{Rel,i}$ of all lines from the two chirps A and B are calculated from all ascertained frequency positions $K_{1,n}$ or $K_{2,p}$ using the equations $$R_i = \Delta R \cdot \frac{\kappa_{2,p} - \kappa_{1,n}}{m_1 - m_2}$$

and/or $$v_{Rel,i} = \Delta v \cdot \frac{m_1 \kappa_{2,p} - m_2 \kappa_{1,n}}{m_1 - m_2}.$$

All of the intersections are considered to be potential obstacles, but the rate or occurrence of ghost obstacles can be relatively high.

Intersection points $r_i$, $v_{Rel,i}$ detected in the first step are validated by the ascertained peak positions in chirp C. The validation criterion for this case is that a peak exists in the spectrum of third chirp C at frequency position $K_{3,q}$, for which the following applies:

$$\kappa_{3,q} - \varepsilon_1 \le \left(\frac{v_{Rel,i}}{\Delta v} - m_3 \cdot \frac{R_i}{\Delta R}\right) \le \kappa_{3,q} + \varepsilon_1$$

Figure 4:
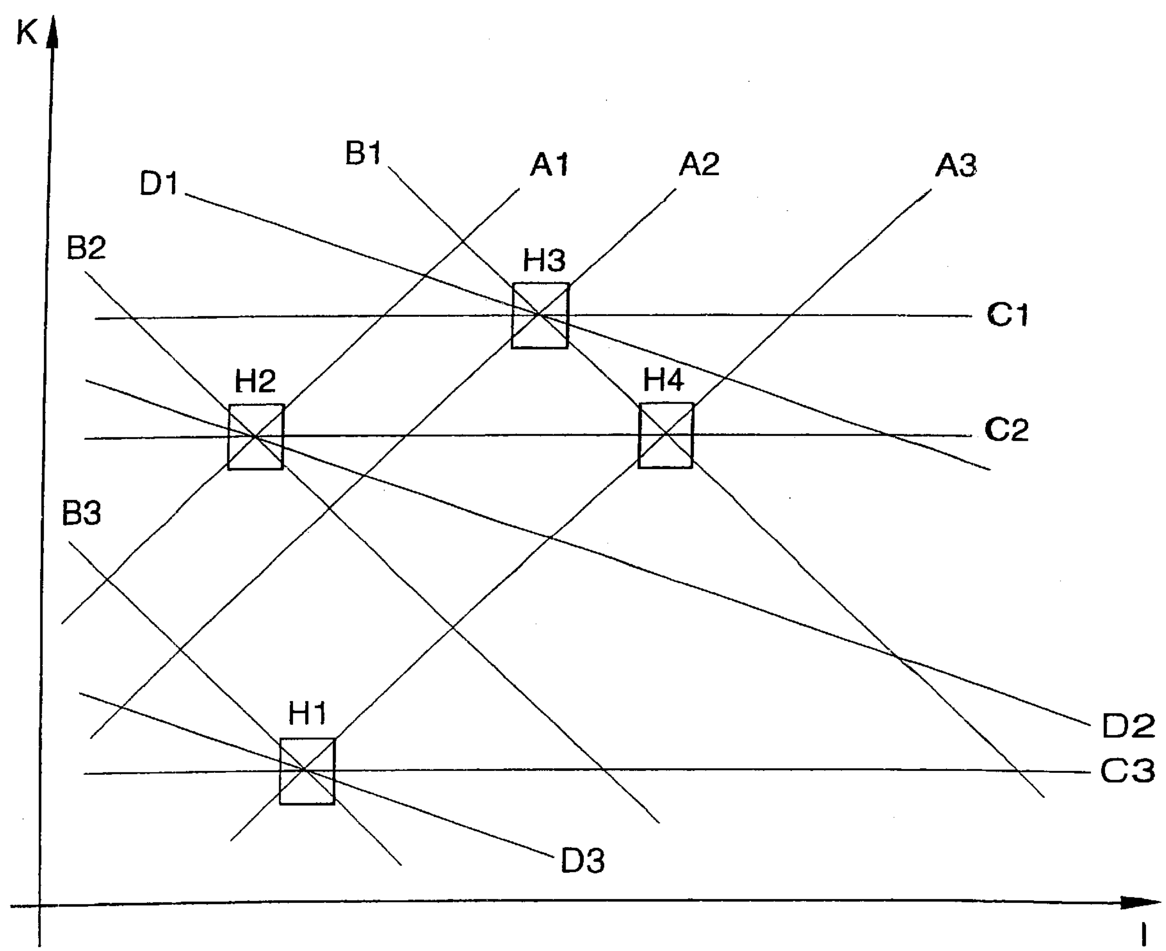
FIG. 4 shows the frequencies ascertained during measurements A, B, C, and D in a distance-relative speed diagram.

The result of this is the situation represented in FIG. 4, in which a total of four intersection points H1, H2, H3, and H4 exist, in each of which three of the lines of the peak positions ascertained from chirps A, B, and C intersect. In addition, a rectangle representing the $\epsilon_1$ surrounding area of each of intersection points H1 through H4 is schematically drawn in for each of these intersection points H1 through H4 in FIG. 4. The above-mentioned criterion is satisfied for each of intersection points H1 through H4, since one of lines C1 through C3 passes through each one of the $\epsilon_1$ ranges of intersection points H1 through H4. The previously described validation step can reduce the number of ghost obstacles considerably. Whenever there is a plurality of obstacles, however, it must be assumed that the proportion of ghost obstacles may be too high.

Therefore, the present invention reduces the number of intersection points classified as valid by the validation with third chirp C to a very safe, lesser amount, using an additional validation with fourth chirp D, which follows a similar criterion. The validation criterion for this case is that a peak exists in the spectrum of fourth chirp D at frequency position $K_{4,r}$, for which the following applies:

$$\kappa_{4,r} - \varepsilon_2 \le \left(\frac{v_{Rel,i}}{\Delta v} - m_4 \cdot \frac{R_i}{\Delta R}\right) \le \kappa_{4,r} + \varepsilon_2$$

In the case of the present exemplary embodiment, this results in the situation represented in FIG. 4, in which each of lines D1, D2, and D3 belonging to the peak positions of fourth chirp D pass inside the $\epsilon_2$ surrounding areas of intersection points H1, H2, and H3. In contrast, none of lines D1, D2, and D3 pass through the $\epsilon_2$ surrounding area of intersection point H4. This intersection point H4 can be identified as a ghost obstacle and sorted out.

The intersection points validated twice in this manner can be regarded as a set having a very small proportion of ghost targets, and the corresponding information can be evaluated in the subsequent further processing of data.

Advantageously, the values of parameters $\epsilon_1$ and $\epsilon_2$ are in the range of 0.3 to 0.7, preferably in the range of 0.4 to 0.6, and more preferably 0.5. This may ensure that a reliable validation is carried out in accordance with the first and second validation criteria, and thus the ghost-target portion of the amount of calculated intersection points can be limited to a minimum. The values of $\epsilon_1$ and $\epsilon_2$ can preferably be equal.

What is claimed is:

1. A radar method for measuring distances between and relative speeds of a vehicle and one or more obstacles, comprising:

emitting a transmission signal, the transmission signal being generated using an oscillator and having a sequence of linear chirps, and simultaneously receiving a receiving signal, the receiving signal being reflected at at least one obstacle during the emission of the transmission signal;

acquiring a mixer output signal resulting from mixing the receiving signal with the transmission signal in a mixer;

processing the mixer output signal in a signal processing device (9) to obtain at least one signal value for at least one distance ($R_i$) of the at least one obstacle to the vehicle and for at least one relative speed ($v_{Rel,i}$) of the vehicle and any detected at least one obstacle;

analyzing the mixer output signal for each chirp of the transmission signal using a Fourier transform resulting in a spectrum, and calculating the respective frequency position $K_i$ of each of the at least one obstacle as a respective at least one peak in the Fourier transform spectrum;

providing a sequence of the transmission signal with at least four consecutive chirps (A, B, C, D) having respective slopes ($m_1$, $m_2$, $m_3$, $m_4$), each of the at least four consecutive chirps (A, B, C, D) being different in value for each of the sequence of the transmission signal;

calculating at least one intersection point at the at least one distance $R_i$ of the at least one obstacle to the vehicle and the at least one relative speed $v_{rel,i}$ of the vehicle and the any detected at least one obstacle, the intersection points being from any lines resulting from two of the chirps (A, B) and being calculated from the frequency positions $K_{1,n}$ and $K_{2,p}$ in the distance-relative speed diagram;

checking a first condition to determine whether a peak in the Fourier spectrum of the third chirp (C) exists at a frequency position $K_{3,q}$, whose assigned line in the distance-relative speed diagram intersects a surrounding area of the intersection point ($R_i$, $v_{rel,i}$);

checking a second condition to determine whether a peak in the Fourier spectrum of the fourth chirp (D) exists at a frequency position $K_{4,r}$, whose assigned line in the distance-relative speed diagram intersects a surrounding area of the intersection point ($R_i$, $v_{rel,i}$); and validating the intersection points ($R_i$, $v_{rel,i}$) as valid when the first and the second conditions are checked and determined satisfied.

2. The method as recited in claim 1, respectively, wherein the intersection points ($R_i$, $v_{rel,i}$) of all lines from the first two chirps (A, B) are calculated from all the ascertained frequency positions $K_{1,n}$ and $K_{2,p}$ according to the equations $$R_i = \Delta R \cdot \frac{\kappa_{2,p} - \kappa_{1,n}}{m_1 - m_2},$$

$$v_{Rel,i} = \Delta v \cdot \frac{m_1 \kappa_{2,p} - m_2 \kappa_{1,n}}{m_1 - m_2},$$

where ΔR signifies the distance resolution and where Δv signifies the resolution of the speed.

3. The method as recited in claim 1 or 2, wherein the calculated intersection points ($R_i$, $v_{Rel,i}$) are checked to determine whether a peak in the Fourier spectrum of a third chirp (C) exists at a frequency position $K_{3,q}$, for which $$k_{3,q} - \varepsilon_1 \le \left(\frac{v_{Rel,i}}{\Delta v} - m_3 \cdot \frac{R_i}{\Delta R}\right) \le k_{3,q} + \varepsilon_1$$

is valid, where $\epsilon_1$ represents a parameter of predefined magnitude.

4. The method as recited in claim 3, wherein the intersection points ($R_i$, $v_{Rel,i}$) are checked to determine whether a peak in the Fourier spectrum of a fourth chirp (D) exists at a frequency position $K_{4,r}$, for which $$k_{4,r} - \varepsilon_2 \le \left(\frac{v_{Rel,i}}{\Delta v} - m_4 \cdot \frac{R_i}{\Delta R}\right) \le k_{4,r} + \varepsilon_2$$

is valid, where $\epsilon_2$ represents a parameter of predefined magnitude.

5. The method as recited in claim 4, wherein the values of the parameters $\epsilon_1$ and $\epsilon_2$ are in the range of 0.3 to 0.7.

6. The method as recited in claim 4, wherein the values of the parameters $\epsilon_1$ and $\epsilon_2$ are in the range of 0.4 to 0.6.

7. The method as recited in claim 4, wherein the values of the parameters $\epsilon_1$ and $\epsilon_2$ are each 0.5.

8. The method as recited in claim 4, wherein the values of the parameters $\epsilon_1$ and $\epsilon_2$ are equal.

9. The method as recited in claim 3, wherein the values of the parameters $\epsilon_1$ and $\epsilon_2$ are in the range of 0.3 to 0.7.

10. The method as recited in claim 3, wherein the values of the parameters $\epsilon_1$ and $\epsilon_2$ are in the range of 0.4 to 0.6.

11. The method as recited in claim 3, wherein the values of the parameters $\epsilon_1$ and $\epsilon_2$ are each 0.5.

12. The method as recited in claim 3, wherein the values of the parameters $\epsilon_1$ and $\epsilon_2$ are equal.

13. The method as recited in claim 1 or 2, wherein the intersection points ($R_i$, $v_{Rel,i}$) are checked to determine whether a peak in the Fourier spectrum of a fourth chirp (D) exists at a frequency position $K_{4,r}$, for which $$k_{4,r} - \varepsilon_2 \leq \left(\frac{v_{Rel,i}}{\Delta v} - m_4 \cdot \frac{R_i}{\Delta R}\right) \leq k_{4,r} + \varepsilon_2$$

is valid, $\epsilon_2$ representing a parameter of predefined magnitude.

14. The method as recited in claim 13, wherein the values of the parameters $\epsilon_1$ and $\epsilon_2$ are in the range of 0.3 to 0.7.

15. The method as recited in claim 13, wherein the values of the parameters $\epsilon_1$ and $\epsilon_2$ are in the range of 0.4 to 0.6.

16. The method as recited in claim 13, wherein the values of the parameters $\epsilon_1$ and $\epsilon_2$ are each 0.5.

17. The method as recited in claim 13, wherein the values of the parameters $\epsilon_1$ and $\epsilon_2$ are equal.

18. A radar device for measuring distances between and relative speed of a vehicle and at least one obstacle, comprising:

an arrangement configured to emit a transmission signal generated using an oscillator and including a sequence of linear chirps;

an arrangement configured to simultaneously receive a receiving signal reflected at at least one obstacle during the emission of the transmission signal;

an arrangement configured to acquire a mixer output signal resulting from mixing the receiving signal with the transmission signal in a mixer;

an arrangement configured to process the mixer output signal to obtain at least one signal value for at least one distance of the at least one obstacle to the vehicle and for at least one relative speed of the vehicle and any detected at least one obstacle;

an arrangement configured to analyze the mixer output signal for each chirp of the transmission signal using a Fourier transform resulting in a spectrum;

an arrangement configured to calculate the respective frequency position of each of the at least one obstacle as a respective at least one peak in the Fourier transform spectrum;

an arrangement configured to provide a sequence of the transmission signal with at least four consecutive chirps having respective slopes, each of the at least four consecutive chirps being different in value for each of the sequence of the transmission signal;

an arrangement configured to calculate at least one intersection point at the at least one distance of the at least one obstacle to the vehicle and the at least one relative speed of the vehicle and the any detected at least one obstacle, the intersection points being from any lines resulting from two of the chirps and being calculated from the frequency positions in the distance-relative speed diagram;

an arrangement configured to check a first condition to determine whether a peak in the Fourier spectrum of the third chirp exists at a frequency position, whose assigned line in the distance-relative speed diagram intersects a surrounding area of the intersection point;

an arrangement configured to check a second condition to determine whether a peak in the Fourier spectrum of the fourth chirp exists at a frequency position, whose assigned line in the distance-relative speed diagram intersects a surrounding area of the, intersection point; and an arrangement configured to validate the intersection points as valid when the first and the second conditions are checked and determined satisfied.

* * * * *